(12) United States Patent
Treves et al.

(10) Patent No.: US 9,680,945 B1
(45) Date of Patent: Jun. 13, 2017

(54) DYNAMIC SKILL-BASED CONTENT RECOMMENDATIONS

(71) Applicant: Audible, Inc., Newark, NJ (US)

(72) Inventors: Dikla Treves, New York, NY (US); Francis Andrew Shanahan, Watchung, NJ (US); Lisa Marie Stringer, Jersey City, NJ (US); Guy Ashley Story, Jr., New York, NY (US); Aman Sagar, Hoboken, NJ (US); Puneet Girdhar, Scotch Plains, NJ (US); Jodi Rothstein, New York, NY (US)

(73) Assignee: Audible, Inc., Newark, NJ (US)

( * ) Notice: Subject to any disclaimer, the term of this patent is extended or adjusted under 35 U.S.C. 154(b) by 322 days.

(21) Appl. No.: 14/303,540

(22) Filed: Jun. 12, 2014

(51) Int. Cl.
*G06F 15/16* (2006.01)
*H04L 29/08* (2006.01)

(52) U.S. Cl.
CPC .................................. *H04L 67/22* (2013.01)

(58) Field of Classification Search
None
See application file for complete search history.

(56) References Cited

U.S. PATENT DOCUMENTS

| | | | | |
|---|---|---|---|---|
| 6,953,343 B2 * | 10/2005 | Townshend | ............... | G09B 7/04 434/178 |
| 7,882,032 B1 * | 2/2011 | Hoffman | ............. | G06F 21/6218 705/50 |
| 2004/0260574 A1 * | 12/2004 | Gross | ..................... | G06Q 30/02 705/1.1 |
| 2005/0144133 A1 * | 6/2005 | Hoffman | ................ | C07K 14/53 705/50 |
| 2009/0254971 A1 * | 10/2009 | Herz | ..................... | G06Q 10/10 726/1 |
| 2013/0091429 A1 | 4/2013 | Weng et al. | | |
| 2013/0137518 A1 * | 5/2013 | Lucas | ..................... | A63F 13/12 463/42 |
| 2013/0196292 A1 * | 8/2013 | Brennen | ................ | G09B 19/06 434/157 |
| 2014/0019526 A1 * | 1/2014 | Zeng | ..................... | G06F 17/289 709/203 |
| 2014/0358773 A1 * | 12/2014 | Lerner | ................... | G06Q 40/00 705/39 |

* cited by examiner

*Primary Examiner* — Brian Whipple
(74) *Attorney, Agent, or Firm* — Knobbe, Martens, Olson & Bear, LLP (57) ABSTRACT

Systems and methods are disclosed enabling recommendations of content items based on a difficulty of the content item as well as a skill level of the user. Skill-based content recommendations may be utilized, for example, in recommending content to language learners. Skill-based recommendations may be based on a variety of difficulty metrics of the content item, such as vocabulary and complexity of the language (e.g., words per paragraph, syllables per word, etc.), as well as a variety of skill metrics of the user (e.g., as explicitly provided by the user or implicitly determined based on a user's interaction with content items). Advantageously, such metrics can enable generation of recommendations based on a multi-dimensional difficulty assessment. Further, difficulty metrics, skill metrics, or the relationship between such metrics may be dynamically updated over time based on continued feedback from users, such that recommendations are dynamically improved.

21 Claims, 5 Drawing Sheets

DYNAMIC SKILL-BASED CONTENT RECOMMENDATIONS

BACKGROUND

Generally described, computing devices utilize a communication network, or a series of communication networks, to exchange data. Companies and organizations operate computer networks that interconnect a number of computing devices to support operations or provide services to third parties. In some instances, computing networks may be used to transmit items of digital content to users for consumption on a user's computing device. For example, a user's computing devices may visually convey items of content such as animations, electronic books, electronic periodicals, movies, television programs, multi-media content and portions thereof on an electronic screen or touchscreen. A user's computing devices may also direct audible output through headphones or speakers to convey items of audible content such as audiobooks, songs, movies, television programs, multi-media content and portions thereof.

Digital content may be utilized by users in a variety of contexts. For example, users desiring to learn a language may utilize digital content in that language to increase the user's exposure to the language, with the goal of increasing the user's fluency. In language learning applications, the difficulty of a content item (e.g., due to the specific vocabulary used or the nature of presentation of the language) can greatly affect the ability of a user to comprehend the item. However, the perceived difficulty of an item may vary between individual users. Consequently, selecting digital content of an appropriate difficulty can be challenging to users.

DETAILED DESCRIPTION

Generally described, aspects of the present disclosure relate to generating recommendations for digital content items to users based on a difficulty of the content item and an expected skill of the user in comprehending the content item. Illustratively, aspects of the present disclosure can be utilized by users learning a foreign language to receive recommendations for content items, such as electronic books, audiobooks, or videos (e.g., television or movie programs) of an appropriate difficulty in the learned language. Specifically, disclosed herein is a skill-based content delivery system that may utilize either or both of implicit or explicit user feedback regarding content items to assess the difficulty of content items according to a variety of difficulty metrics. The skill-based content delivery system can further utilize implicit or explicit user feedback to determine a user's skill level according to a variety of skill metrics corresponding to the difficulty metrics. Thereafter, items of digital content can be recommended to users based on correlating the user's individual skill metrics to difficulty metrics of the content items. Advantageously, the disclosed skill-based content delivery system may utilize individual difficulty and skill metrics to recommend content items based on a multi-dimensional analysis, without requiring that either a user's skill or a content item's difficulty be placed within a one dimensional scale. Moreover, the skill-based content delivery system may utilize feedback from users to programmatically adjust difficulty metrics of content items, skill metrics of users, and the process by which difficulty metrics and skill metrics are compared. Accordingly, the disclosed skill-based content delivery system can provide dynamically adjusting recommendations for content based at least in part on a plurality of content difficulty and user skill metrics.

In one embodiment, the skill-based content delivery system determines the difficulty of a content item, as well as the skill of users at comprehending the content item, based on explicit feedback from a user. For example, subsequent to consuming a content item, a user may complete a questionnaire providing feedback regarding various metrics of the content item, such as the difficulty of the vocabulary or grammar or the interest of the user in the content. As discussed in more detail below, explicit feedback received from the user can then be used by the skill-based content delivery system to dynamically adjust the user's skill level, the difficulty level of the content, or the algorithm by which content items are recommended to users.

In another embodiment, skill-based content delivery system can utilize implicit feedback of users in determining the difficulty level of a content item or the skill level of the user. Specifically, users of the skill-based content delivery system may utilize a computing device to consume digital content items. Further, users may authorize such computing devices to monitor limited portions of their interactions with the content items to assess either or both of the user's skill level and the difficulty of the content item. As an illustrative example, assume that a user utilizes their computing device to consume an electronic book (also referred to as an "e-book"). During consumption, the computing device may monitor various aspects of the user's reading, such as a speed at which the user consumes the content (e.g., based on page turns), the total duration spent reading the book, the length of reading sessions, the frequency at which portions of the e-book are re-read or repeated, the portions of the e-book highlighted, bookmarked or otherwise flagged by the user, the words for which definitions are viewed, the frequency of definition views, whether the user completes the e-book, or whether the user recommends the e-book to other users (e.g., via a rating, review or recommendation of the e-book on the skill-based content delivery system or another connected system, such as a social networking system). Thereafter, the computing device can, with consent of the user, transmit monitored consumption information to the skill-based content delivery system for analysis. As will be described in more detail below, monitored consumption information can thereafter be used by the skill-based content delivery system to determine skill metrics of the user, as well as difficulty metrics of the e-book. Still further, the skill-based content delivery system can utilize the consumption information to alter an algorithm by which content is recommended to users. Because each interaction of a user with the skill-based content delivery system can serve to modify future recommendations of content items to both the individual user and to other users, the skill-based content delivery system can be viewed as a dynamically adjusting content recommendation system.

The presently disclosed skill-based content delivery system presents advantages over existing systems that assign a single, fixed difficulty level to a content item. Such systems frequently combine a variety of metrics into a single difficulty scale. However, such scales fail to recognize the wide variety in various skill metrics among users. For example, a first user may have a relatively strong skill in understanding the grammatical structure of a language, but lack a wide vocabulary. In contrast, a second user may have already established a strong vocabulary, but lack grammatical skill. In some instances, variations in skills may be influenced by the background of a user. For example, French-language users attempting to learn English may generally possess strong vocabularies by virtue of the historical French influence on modern English. In contrast, Chinese-language users attempting to learn English may have relatively little vocabulary at the beginning of their studies. Single-metric difficulty scales are unable to compensate for this variety of skill metrics among users, and therefore can provide inaccurate recommendations.

Still further, the fixed nature of many established difficulty metrics often leads to inaccurate difficulty assessments of content items. Specifically, existing difficulty grading systems can utilize a variety of fixed aspects of a content item, such as words per sentence or vocabulary used, to assign a difficulty level to the content item. Such systems may also utilize individual assessments of the content item, such as assessments by experts or test groups. However, these systems generally do not enable the difficulty of a content item to be subsequently adjusted based on implicit or explicit feedback of users. Therefore, the dynamic, multi-dimensional capabilities of the presently disclosed skill-based content delivery system can enable increased accuracy in recommending content items to users over existing recommendation systems.

Figure 1:
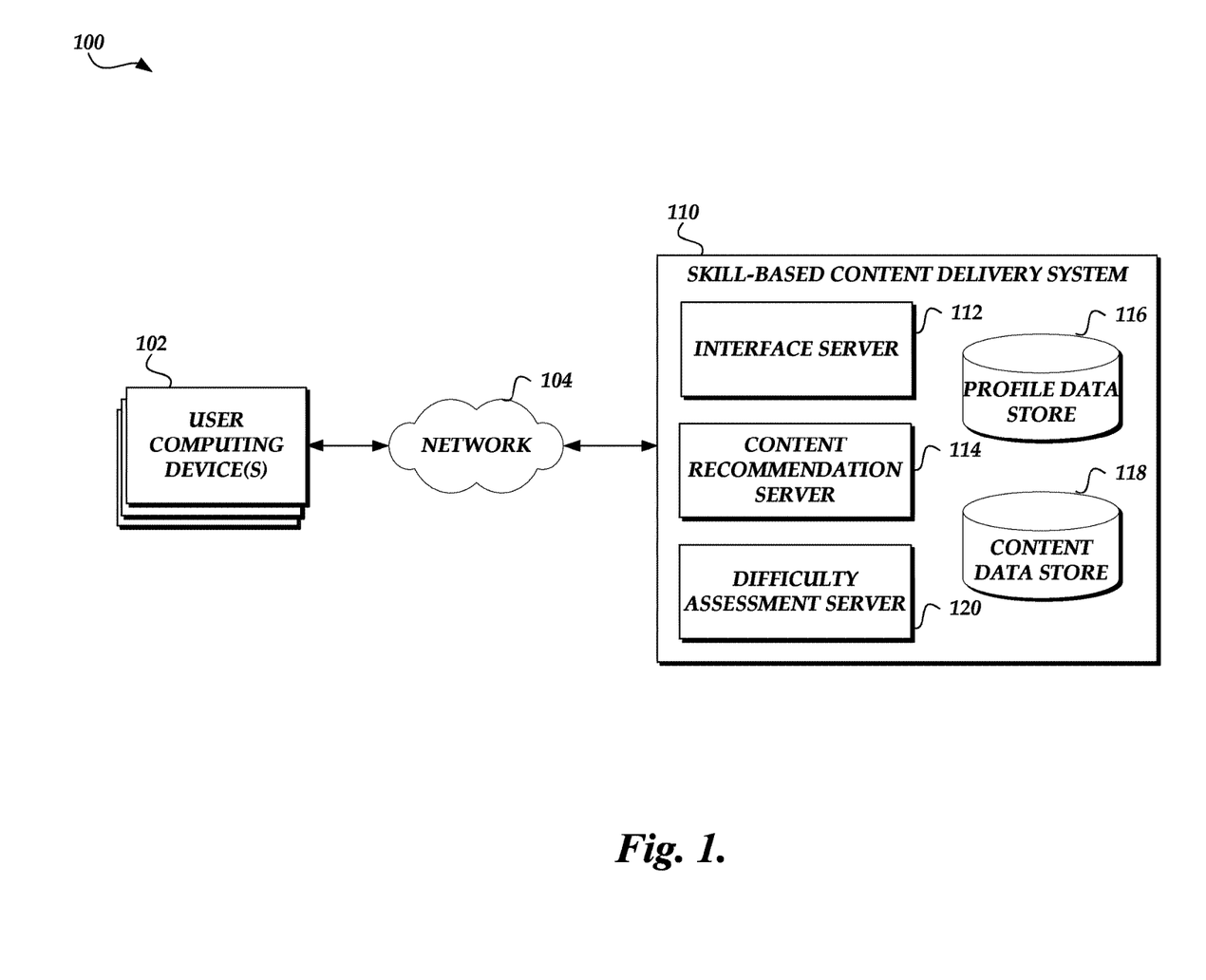
FIG. 1 is a schematic block diagram of an illustrative network environment in which a skill-based content delivery system may operate.

With reference to FIG. 1, an illustrative operating environment 100 is shown which enables users, via user computing devices 102, to receive skill-based content recommendations, and to browse for, acquire access rights to, and receive recommended content items from a skill-based content delivery system 110. As will be described in more detail below, the skill-based content delivery system 110 can be configured to utilize implicit and explicit feedback, exclusively or in addition to other metrics, to assess difficulty metrics of content items as well as skill metrics of users, and to recommend content items to users based on such difficulty and skill metrics. Users, utilizing the user computing devices 104, may acquire recommended content items from the skill-based content delivery system 110 and thereafter provide feedback regarding the recommended content item, which may be utilized to dynamically adjust future recommendations generated by the skill-based content delivery system 110.

A user computing device 102 can correspond to any device utilized by a user to interact with the skill-based content delivery system 110 (e.g., to browse for, acquire rights to, or receive content items). Such user computing devices 102 include, but are not limited to, laptops, personal computers, tablet computers, personal digital assistants (PDAs), hybrid PDA/mobile phones, mobile phones, electronic book readers, digital media players, integrated components for inclusion in computing devices, appliances, electronic devices for inclusion in vehicles or machinery, gaming devices, set top boxes, electronic devices for inclusion in televisions, and the like. These user computing devices 102 may be associated with any of a number of visual, tactile, or auditory output devices, and may be associated with a number of devices for user input, including, but not limited to, keyboards, mice, trackballs, trackpads, joysticks, input tablets, trackpoints, touch screens, remote controls, game controllers, motion detectors and the like. In some embodiments, multiple user computing devices 102 may be utilized in conjunction to facilitate playback of content items. For example, a first user computing devices 102 (e.g., a smartphone) may represent an input enabling user control of playback on a second user computing devices 102 (e.g., a television). Accordingly, reference to a user computing devices 102 within the present disclosure may include multiple computing devices working in conjunction to facilitate playback of a dynamic content item.

The user computing devices 102 may communicate with the skill-based content delivery system 110 via a network 104. The network 104 may be any wired network, wireless network or combination thereof. In addition, the network 104 may be a personal area network, local area network, wide area network, cable network, satellite network, cellular telephone network or combination thereof. In the illustrated embodiment, the network 104 is the Internet. Protocols and components for communicating via the Internet or any of the other aforementioned types of communication networks are well known to those skilled in the art of computer communications and thus, need not be described in more detail herein.

The skill-based content delivery system 110 is illustrated in FIG. 1 as operating in a distributed computing environment comprising several computer systems that are interconnected using one or more networks. More specifically, the skill-based content delivery system 110 includes an interface server 112, a content recommendation server 114, a profile data store 116, a content data store 118 and a difficulty ranking server 120 discussed in greater detail below. However, it may be appreciated by those skilled in the art that the skill-based content delivery system 110 may have fewer or greater components than are illustrated in FIG. 1. In addition, the skill-based content delivery system 110 could include various Web services and/or peer-to-peer network configurations. Thus, the depiction of the skill-based content delivery system 110 in FIG. 1 should be taken as illustrative and not limiting to the present disclosure.

Any one or more of the interface server 112, the content recommendation server 114, the profile data store 116, the content data store 118, and the difficulty assessment server 120 may be embodied in a plurality of components, each executing an instance of the respective interface server 112, content recommendation server 114, profile data store 116, content data store 118 and difficulty assessment server 120. A server or other computing component implementing any one of the interface server 112, the content recommendation server 114, the profile data store 116, the content data store 118, and the difficulty assessment server 120 may include a network interface, memory, processing unit, and computer readable medium drive, all of which may communicate which each other may way of a communication bus. The network interface may provide connectivity over the network 104 and/or other networks or computer systems. The processing unit may communicate to and from memory containing program instructions that the processing unit executes in order to operate the respective interface server 112, content recommendation server 114, profile data store 116, content data store 118 and difficulty assessment server 120. The memory may generally include RAM, ROM, other persistent and auxiliary memory and/or any non-transitory computer-readable media.

With further reference to FIG. 1, illustrative components of the skill-based content delivery system 110 will now be discussed. The interface server 112 can facilitate browsing and acquisition by customers of content items, such as audio books, available from the skill-based content delivery system 110. Accordingly, the interface server may provide to the user computing devices 102 information regarding content items available from the skill-based content delivery system 110. In one embodiment, information regarding content items may be provided via web pages. In another embodiment, information regarding content items may be provided via specialized applications executing on the user computing devices 102, such as a mobile-device application provided by the skill-based content delivery system 110. One illustrative example of a detail page providing information regarding a content item will be discussed below with reference to FIG. 4. In addition, the interface server 112 may enable user computing devices 102 to maintain profile information within the skill-based content delivery system 110, including payment information, user preferences, information regards access rights to acquire content items, skill-assessments, feedback regarding content items, etc. User profile information can be stored within the profile data store 116, which may correspond to any non-volatile data storage device, such as a network access storage device or a database. The interface server 112 may further enable users, using the user computing devices 102, to request and receive skill-based recommendations for content items available for acquisition from the skill-based content delivery system 110, as will be discussed in more detail below.

The skill-based content delivery system 110 can further include a content recommendation server 114 configured to generate and provide to the user computing devices 102 skill-based recommendations regarding content items available from the skill-based content delivery system 110. As will be described below, the content recommendation server 114 may utilize skill metrics for a specific user, as well as difficultly metrics of content items available from the skill-based content delivery system 110, to select a content item to recommend to a user. Skill metrics of a user may be stored, for example, within the profile data store 116. Illustratively, skill metrics may be based at least in part on explicit information provided by the user (e.g., a self-ranking, a score on an administered evaluation, etc.), on implicit information of the user (e.g., based on previous consumption of content items), or a combination thereof. In addition to skill and difficulty metrics, the content recommendation server 114 may utilize a variety of different recommendation mechanisms to select content items to recommend to a user. Various additional recommendation mechanisms are well known within the art, and therefore will be not discussed in more detail herein.

The skill-based content delivery system 110 of FIG. 1 further includes a difficulty assessment server 120 configured to assess difficulty metrics of content items as well as skill metrics of users. Specifically, the difficulty assessment server can utilize information regarding a content item, such as characteristics of the content item or feedback of users regarding the content item, to assign a set of difficulty metrics to the content item. Examples of difficulty metrics may include the format of the content item (e.g., text, audio, video, or a combination thereof), the level and variety of vocabulary used by a content item, the average number of words per sentence within the content item, the average number of syllables per word within the content item, and the average difficulty rating of the content item by users of the skill-based content delivery system 110. Determination of difficulty metrics for a content item will be described in more detail below.

The difficulty assessment server 120 can further utilize information regarding individual users of the skill-based content delivery system 110 to determine a set of skill metrics for the user. Examples of skill metrics can include, for example, a speed at which the user consumes the content (e.g., based on page turns), the total duration spent reading the book, the length of reading sessions, the frequency at which portions of the e-book are re-read, the words for which definitions are viewed, the frequency of definition views, whether the user completes the e-book, or whether the user recommends the e-book to other users (e.g., via a rating, review or recommendation of the e-book on the skill-based content delivery system or another connected system, such as a social networking system). Determination of skill metrics for a user of the skill-based content delivery system 110 will be described in more detail below.

While depicted within FIG. 1 as a single system, the skill-based content delivery system 110 may encompass a variety of disparate systems in communication with one another via a network, such as the network 104. Illustratively, one or both of the content recommendation server 114 and the difficulty assessment server 120 may be operated by a first entity, and provide recommendations regarding content items provided by a second entity. Such a second entity may include, for example, a network-accessible merchant offering content items to the user computing devices 102 for acquisition. In some instances, the content recommendation server 114 and the difficulty assessment server 120 may operate independently from such a network-accessible merchant. Accordingly, the illustrative environment 100 of FIG. 1 is intended to be illustrative, and not limiting, in nature.

Figure 2:
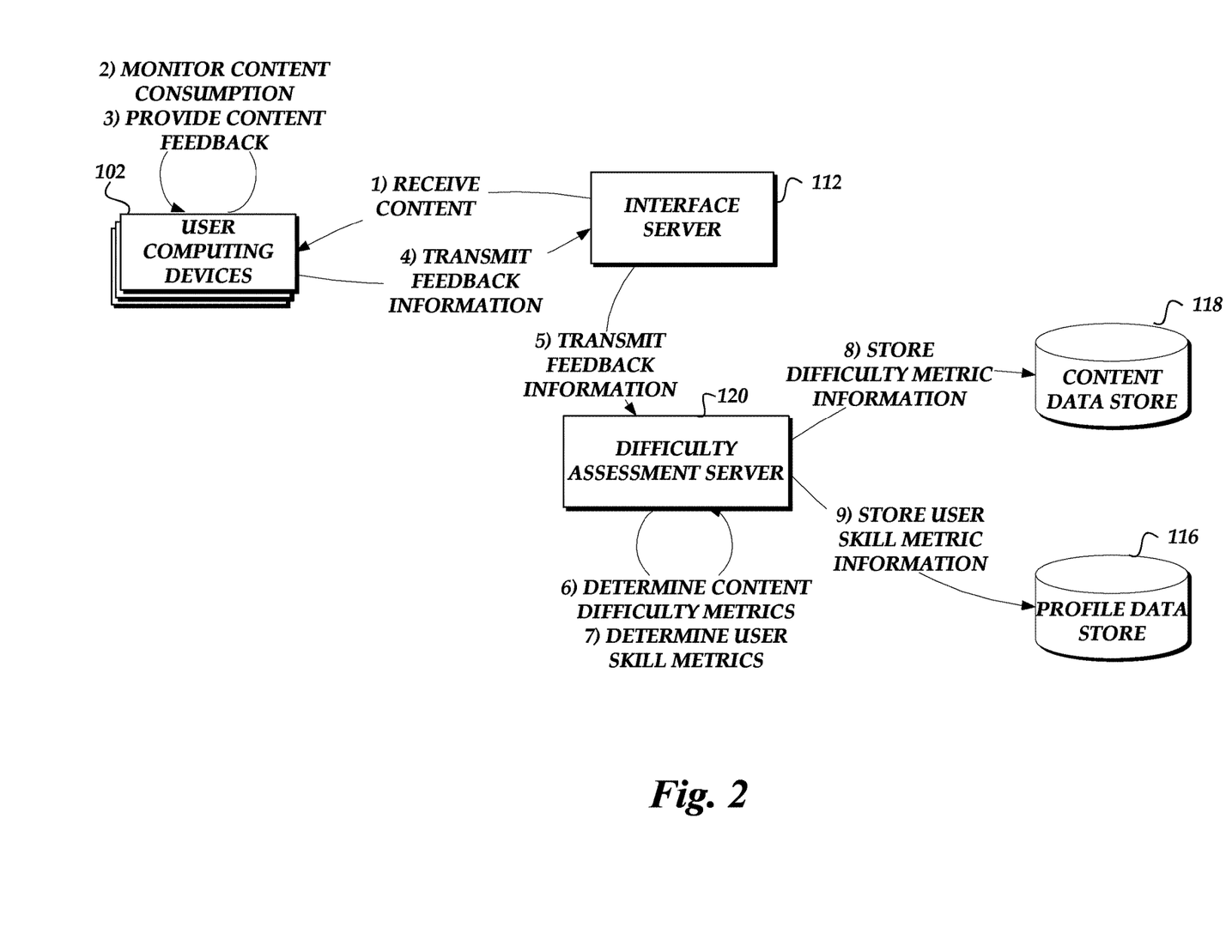
FIG. 2 is a block diagram depicting an illustrative interaction of user computing devices with the skill-based content delivery system of FIG. 1 to assess difficulties of digital content items, and to assess skills of users in comprehending the content items.

With reference to FIG. 2, one illustrative interaction for determining difficulty metrics for content items, as well as skill metrics of users of the skill-based content delivery system 110 of FIG. 1 will be described. As shown in FIG. 2, the interactions begin at (1), where a plurality of user computing devices 102 receive items of digital content from the skill-based content delivery system 110 via the interface server 112. As noted above, items of digital content may correspond to textual, audio, and video content, as well as combinations thereof. For example, items of digital content may include audiobooks, e-books, electronic magazines or articles, short-format audio programs, television programs, or movies. Illustratively, content items may be delivered to the user computing devices 102 subsequent to acquisition of the content items by users of the skill-based content delivery system 110. In one embodiment, reception of a content item may include transmission of a complete content item to a user computing device 102. In another embodiment, reception may include transmission of only a portion of the content item to the user computing device 102 (e.g., during on-demand playback or "streaming" of the content item).

Subsequently, at (2), the user computing device 102 can monitor, with the user's consent, the user's consumption of the content item. Monitored aspects may include, by way of non-limiting example, a speed at which the user consumes the content (e.g., based on page turns), the total duration spent reading the book, the length of reading sessions, the frequency at which portions of the e-book are re-read, the words for which definitions are viewed, the frequency of definition views, whether the user completes the e-book, or whether the user recommends the e-book to other users (e.g., via a rating, review or recommendation of the e-book on the skill-based content delivery system or another connected system, such as a social networking system). In addition, at (3), a user computing device 102 may collect feedback from a user regarding a consumed content item. Examples of feedback may include, for example, a rating or review of the content item, an indication of the difficulty of the content item to the user, or the results of an assessment taken by the user via the user computing device 102 (e.g., a quiz or questionnaire designed to measure comprehension of the content item). While shown sequentially within FIG. 2, interactions (2) and (3) may occur in any order. In some embodiments, either explicit or implicit feedback from the use may be used exclusively. Accordingly, the interactions (2) and (3) are not mutually required to occur with FIG. 2.

Thereafter, the gathered feedback (e.g., as implicitly gathered via monitoring or explicitly provided by a user) is transmitted to the interface server 112 at (4). The interface server 112 then provides the feedback information to the difficulty assessment server 120, at (5). In some embodiments, prior to transmission to the difficulty assessment server 120, the interface server 112 may supplement the feedback information with additional data regarding the content items or users reflected within the feedback information. For example, the interface server 112 may include within the feedback information profile data of the users, such as user locations, ages, genders, languages spoken, primary languages, countries of residence, or previously determined skill metrics.

Thereafter, at (6), the difficulty assessment server 120 can utilize the feedback information, alone or in conjunction with additional information, to determine difficulty metrics for one or more items of content reflected within the feedback information. In one embodiment, the difficulty assessment server 120 may assign an initial set of difficulty metrics to a content item based on inherent characteristics of the content item, such as vocabulary used, length of the content item, words per sentence or syllables per word of the content item. Thereafter, the difficulty assessment server 120 may modify the initial difficulty metrics based on the received feedback information. For example, where a content item is initially assigned a low-vocabulary difficulty, but users have frequently conducted dictionary look-up operations for words within a content item, the vocabulary difficulty of an item can be increased. In some embodiments, feedback of users may be averaged, such that a vocabulary difficulty metric of a content item can be assessed with respect to the average dictionary look-up actions performed by users. In other embodiments, feedback may be averaged based on deviation from an expected value. For example, a content item of a specific initial vocabulary difficulty may be expected to require a defined number of dictionary look up operations based on a vocabulary skill of the user. Accordingly, a user's deviation from that defined number may be utilized in modifying the difficulty of a text. Illustratively, assume a user, based on a previously assessed skill, is expected to perform three dictionary look-up actions per hundred pages, but actually performs five dictionary look-up actions per hundred pages. In such an instance, it may be expected that the initial vocabulary difficulty was too low. Therefore, the difficulty assessment server 120 can be configured to increase the vocabulary difficulty of the content item. Conversely, where users generally comprehend a content item at a higher than expected rate, difficulty metrics corresponding to the assessed comprehension can be decreased. In some embodiments, relationships between a user's feedback and a corresponding difficulty metric may be manually defined (e.g., by an operator of the skill-based content delivery system 110). For example, frequency of vocabulary lookup operations may be manually correlated to a content item's vocabulary difficulty metric. In other embodiments, a user's feedback may be correlated to one or more difficulty metrics based on contextual analysis of feedback information. For example, where a user is asked to rate the overall difficulty of a content item, the effect of the user's rating on specific difficulty metrics may be determined based at least in part on the context of the rating. Illustratively, a user who rates a content item as very difficult shortly after performing a number of vocabulary lookups may result in an increased vocabulary difficulty metric for the content item. As a further illustration, a user who rates a content item as difficult after repeating multiple sections of the content item may result in an increased text complexity difficulty metric for the content item. Accordingly, relatively generic feedback information may be utilized to modify specific difficulty metrics based on contextual analysis of the user's feedback.

In some embodiments, difficulty metrics of a content item can further be based on analysis of similar content items. For example, where three content items of an author are assessed as having a relatively high sentence complexity, a fourth content item by the author might also be expected to have a high sentence complexity. Accordingly, an initial difficulty metric assigned by the difficulty assessment server 120 may be modified to more closely conform to other content items by the author. Though authorship is used as one illustrative example, similar content items may be determined based on a variety of parameters, such as genre, category, subcategory, subject matter, narrator, publisher, or editor of the content item. Similar content items can further be determined by user interaction with the content item (e.g., two content items may be considered similar where users frequently consume both content items).

In addition, at (7), the difficulty assessment server can determine skill metrics for individual users based on the received feedback information. As noted above, user feedback can include information corresponding to one or more skill metrics. For example, feedback may include information regarding a user's assessed proficiency (e.g., a user's reported scores on standardized language assessment tests, such as the Test of English for International Communication (TOEIC), the Test of English as a Foreign Language (TOEFL), the EIKEN Test in Practical English Proficiency, etc.), frequency of dictionary look-up actions, how often content is re-read or re-consumed by the user, the average time spent consuming a content item, the average speed of consumption (e.g., speed of audio playback, number of words, sentences, paragraphs, or pages consumed per unit of time, etc.), whether a content item was completed, or whether the content item was shared with other users. As described with respect to difficulty metrics of a content item, each skill metric may be determined based on average feedback of the user over multiple consumption sessions or content items. For example, the speed of consumption for a user can be determined as an average words-per-minute consumption rate over multiple reading sessions. Still further, each skill metric may be determined based on a deviation from an expected value, based at least in part on a difficulty level of the content. For example, a given e-book may have an expected reading time that varies based on a skill metric of a user. Where a user, based on a previously assessed skill level, exceeds the predicted reading rate (e.g., by a threshold amount), the user's skill metric with regard to reading speed can be increased.

While difficulty and skill metrics are described above as determined based on combinations of factors (e.g., aspects of a content item and feedback regarding the content item; explicit and implicit monitor of a user's content consumption; etc.), difficulty and skill metrics may additionally or alternatively be determined based solely on individual aspects. For example, a user-perception difficulty metric for a content item may be assigned based purely on user's explicit feedback regarding a content item (e.g., as averaged across users or weighted according to a user's skill metrics). Therefore, the difficulty and skill metric assessments described above are intended to be illustrative in nature.

Subsequently, the assessed difficulty and skill metrics can be stored within the skill-based content delivery system 110 for later use. Specifically, at (8), difficulty metric information for the assessed content items is stored within the content data store 118. Similarly, at (9), skill metrics for the assessed users are stored within the profile data store 116. As will be described below, the stored skill and difficulty metrics may thereafter be used by the skill-based content delivery system 110 to provide users with dynamic, multi-dimensional skill-based recommendations for content items.

Figure 3:
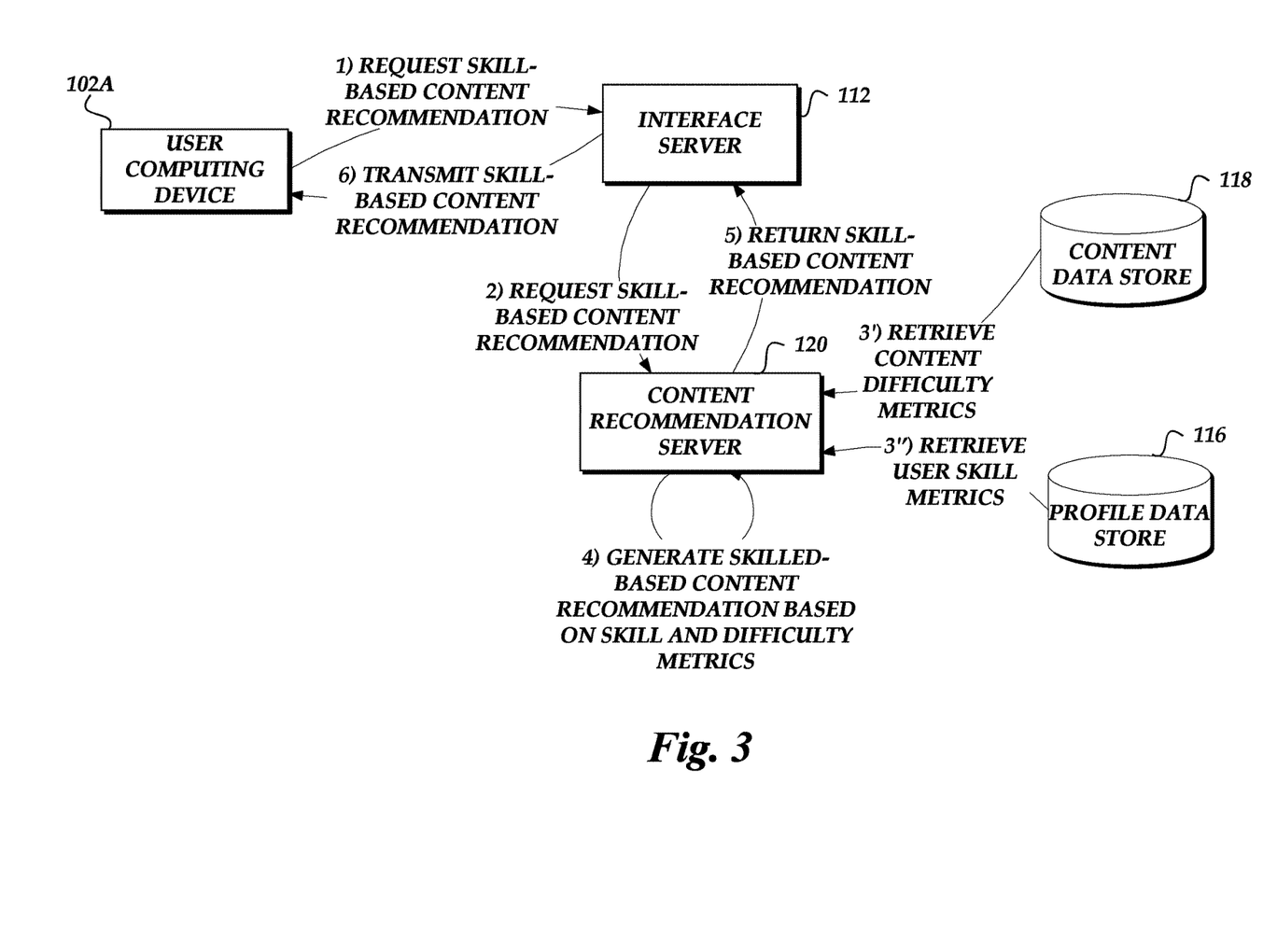
FIG. 3 is a block diagram depicting an illustrative interaction of a user computing device with the skill-based content delivery system of FIG. 1 to receive a recommendation for a digital content item based on the content item's difficulty level and the user's skill level.

With reference to FIG. 3, one illustrative interaction for providing a skill-based recommendation to a user of the skill-based content delivery system 110 will be described. As shown in FIG. 3, the interactions begin at (1), where a request for a skill-based content recommendation is transmitted from a user computing device 102A to the interface server 112. In one embodiment, the request may be transmitted based at least in part on an explicit request by a user to receive a skill-based content recommendation. In another embodiment, the request may be inferred based in part on a request to receive information regarding a content item (e.g., a request to view an item detail page regarding the content item). The request may be transmitted, for example, based on user interaction with a web browser or other application (e.g., a mobile application) executing on the user computing device 102A.

The interface server 112 can, in turn, request a skill-based assessment from the content recommendation server 114 at (2). In some embodiments, prior to transmission to the content recommendation server 114, the interface server 112 may supplement the request with additional information regarding the requesting user. For example, the interface server 112 may include within the request profile data of the user, such as previous ratings or recommendations, prior purchase history, preferences, or interests (e.g., for specific authors, genres, categories, subject matters, etc.).

On receiving a request for a skill-based recommendation, the content recommendation server 120 can retrieve information regarding the user's skill metrics, as well as information regarding difficulty metrics of potential content items. Specifically, at (3'), the content recommendation server 120 can retrieve content difficulty metrics from the content data store 118 for a variety of potentially recommended contents. In some instances, difficulty metrics regarding all or a large portion of content items stored within the content data store 118 may be retrieved. In other instances, difficulty metrics of a specific subset of content items can be retrieved. Such a subset may be determined, for example, based on a manual selection of content items or on user preferences (e.g., for specific genres, authors, categories, etc.). In one embodiment, difficulty metrics may be retrieved for content items recommended according to other recommendation systems or mechanisms. For example, the content recommendation server 120 may implement a first, non-skill-based recommendation system configured according to a variety of known recommendation algorithms to generate an initial recommendation set, and thereafter retrieve difficulty metrics for each content item of the initial recommendation set (e.g., to generate a skill-based recommendation). Further, at (3"), the content recommendation server 120 retrieves skill metrics of the user from the profile data store 116. As noted above, the skill metrics may reflect a user's expected comprehension of content items based, e.g., on the historical content items consumed by the user, difficulty metrics of those content items, a speed at which the user consumed prior content (e.g., based on page turns, words per minute, etc.), the total duration spent reading a content item, the length of reading sessions for a content item, the frequency of re-consuming portions of content items, the words for which definitions are viewed, the frequency of definition views, portions of content items highlighted or flagged by the user, whether the user completed a content item of a given difficulty, or whether the user recommended a content item to other users (e.g., via a rating, review or recommendation of the e-book on the skill-based content delivery system or another connected system, such as a social networking system).

After receiving difficulty metrics of potential content items and skill metrics of the user, the content recommendation server 120, at (4), generates a skill-based content recommendation for the user based on the skill and difficulty metrics. In one embodiment, one or more skill metrics may be mapped to one or more difficulty metrics based on their predictive value. For example, the content recommendation server 120 can determine a correlation coefficient or cosign similarity of a difficulty metric and skill metric combination. As a further example, the content recommendation server 120 may utilize machine learning techniques based on previously collected data to analyze whether a given difficulty metric and skill metric combination is predictive in determining a user's comprehension of a content item. For example, a learning data set may be created including previously determined skill metrics and difficulty metrics for a variety of users consuming a variety of content items. The learning data set may further include assessment metrics indicating whether the user comprehended the content item. Assessment metrics can generally correspond to content-specific skill metrics, such as whether a user completed a content item. Thereafter, machine learning techniques can be utilized to determine whether specific combinations of one or more skill metrics and one or more difficulty metrics are predictive with respect to the assessment metrics for a given user-content item pair. Machine learning techniques are well known within the art, and therefore will not be discussed in detail herein. In some instances, machine learning to determine whether a specific combination of one or more skill metrics and one or more difficulty metrics are predictive may be conducted asynchronously to the interactions of FIG. 3. Correlations between skill metrics and difficulty metrics may further be manually defined (e.g., by an operator of the skill-based content delivery system 110). Such manually defined correlations may be utilized in addition to or exclusive of correlations determined by machine-learning techniques. Accordingly, the content recommendation server 120 may maintain a pre-determined mapping of skill and difficulty metrics, for use in generating skill-based content recommendations.

The content recommendation server 120 may utilize the received difficulty and skill metrics, as well as predicted correlations between difficulty and skill metrics to generate a recommendation for a content item. Specifically, the content recommendation server 120 can attempt to match the skill metrics of the requesting user with difficulty metrics of a content item, such that the user is likely to perceive the difficulty of the content item to fall within a desired range. Illustratively, a user learning a language may desire content items likely to increase their fluency in that language. Such content items are frequently neither extremely easy not extremely difficult for a user. Accordingly, the content recommendation server 120 may attempt to match the skill metrics of a user to difficulty metrics of a content item, such that no individual difficulty metric is too far removed from a corresponding skill metric of the user. For example, the content recommendation server 120 can attempt to correlate a vocabulary skill of the user with a content item of corresponding vocabulary difficulty. In one embodiment, the content recommendation server 120 can determine a "distance" between each skill metric of the user and corresponding difficulty metric of the content item, and select a recommended content item such that no individual distance between a skill metric and difficulty metric pair exceeds a threshold level. In another embodiment, the content recommendation server 120 may utilize a linear algorithm to predict an overall difficulty of the content item for the individual user. For example, the content recommendation server 120 may linearly weight each distance between a user skill metric and a corresponding difficulty metric to determine a personalized difficulty score. While a one-to-one correspondence between skill metrics and difficulty metrics is described above, in some embodiments, any number or combination of skill metrics may correspond to any number or combination of difficulty metrics. Therefore, correspondence between skill and difficulty metrics may be, one-to-one, one-to-many, many-to-one, many-to-many, etc.

In some embodiments, the content recommendation server 120 may utilize alternative or additional parameters to determine an expected difficulty of a content item. For example, a language learner may be expected to perceive a content item as less difficult where the content item corresponds to preferences of the user (e.g., as being authored by a preferred author, falling within a preferred genre, etc.). Accordingly, where the content item corresponds to the preferences of a customer, the content recommendation server 120 may reduce an expected difficulty of the content item. Conversely, where a content item does not correspond to preferences of the user, the content recommendation server 120 may increase the expected difficulty of the content item.

The content recommendation server 120 may thereafter select a content item for recommendation based on the expected difficulty score. For example, the content recommendation server 120 may attempt to select a content item with an expected difficulty sore falling within a predetermined range (e.g., as specified by the user or established by the skill-based content recommendation system). The content recommendation server 120 can then transmit the skill-based content recommendation to the interface server 112 at (5). The interface server 112, in turn, transmits the skill-based content recommendation to the user computing device 102A at (6). In one embodiment, the recommendation may be transmitted via an item detail page or other display page generated by the interface server 112. One example of an item detail page including a skill-based content recommendation will be described in more detail below with reference to FIG. 4. In another embodiment, the skill-based content recommendation is displayed within a dedicated software application executing on the user computing device 102A, such an e-book or audiobook playback software. One skilled in the art will appreciate that the recommendation may be transmitted through any communication channel established between the interface server 112 and the user computing device 102, including, for example, electronic mail, telephonic message (e.g., via short message services), or other electronic message.

Figure 4:
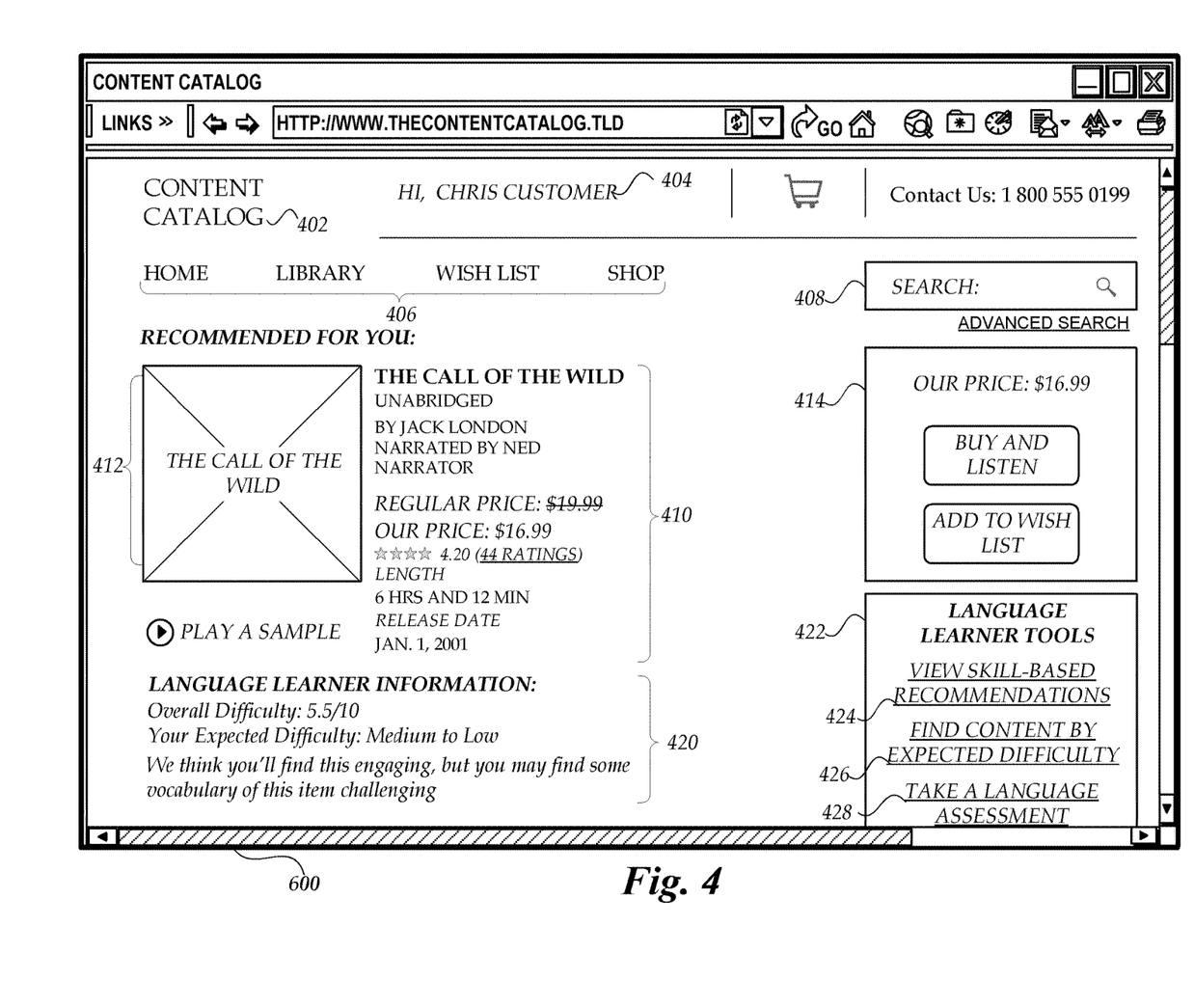
FIG. 4 depicts an illustrative user interface that may be used to provide users of the skill-based content delivery system of FIG. 1 with skill-based content recommendations.

With reference now to FIG. 4, one example of an illustrative user interface 400 by which a user may view a skill-based content recommendation, request additional skill-based content recommendations, and interact with the skill-based content delivery system 110 of FIG. 1 will be described. Specifically, the user interface 400 presents information regarding an audio content recommended by the skill-based content delivery system 110 based on skill metrics of a user, and enables the user to acquire the recommended content item. While the user interface 400 is generally directed to audio content, embodiments of the present disclosure may include generation of user interfaces directed to other content formats, such as textual content or multimedia content.

In one embodiment, user interface 400 is generated by interface server 112 as a result of a previous request for a skill-based content recommendation by the user (e.g., via a mobile application, browser software, etc.). As shown in FIG. 4, the user interface 400 provides information retrieved from the skill-based content delivery system 110, i.e., the "Content Catalog" 402 to "Chris Customer" 404, an illustrative user accessing the "Content Catalog" 402. Because the user is viewing details regarding a specific offered item of audio content, and may wish to browse to other audio content, navigation links 406 are displayed. Navigation links 406 enable a user to browse and select other content available from the skill-based content delivery system 110. Similarly, display feature 408 enables a user to search the Content Catalog for additional content items. Currently, the user interface 400 depicts information for the audio content "The Call of the Wild," authored by Jack London and narrated by "Ned Narrator" (a fictional entity), as illustrated in display feature 410. Display feature 410 further includes additional information regarding the content item, such as a purchase price for the standard version, a length, a release date and a number of content item reviews or ratings. In addition, the interface 400 includes a graphic or image 412 related to the content item, which may be a "cover image" of the audio book.

The user interface 400 further includes content portions 420 and 422, enabling Chris Customer to receive and request skill-based content recommendations from the skill-based content delivery system 110. Specifically, content portion 420 includes an indication of the overall expected difficulty of the content item, as well as a personalized difficulty assessment for Chris Customer. As shown in FIG. 4, the overall difficulty rating of "The Call of the Wild" in audiobook format is 5.5 on a scale of 10. This overall difficulty can be calculated, for example, based on a linear weighting of each difficulty metric associated with the audiobook. In some embodiments, the overall difficulty may be dynamic, such that interaction with the content item by users of the skill-based content delivery system 110 can alter the overall difficulty rating. For example, a highly skilled reader (e.g., expected to easily comprehend the audiobook) that rates the audiobook as very difficult may cause the overall difficulty rating to rise. The change in overall difficulty rating caused by any single user may be proportional to the total number of users that have contributed to the difficulty metrics of the content item. Therefore, in a large system, individual users can be expected to have a relatively small impact on the difficulty rating of a content item. Nevertheless, dynamic modification of difficulty metrics (and a resulting overall difficulty) represents an advantage of the skill-based content delivery system 110 over fixed-difficulty systems (e.g., which do not enable modification of a content item's difficulty level after establishment).

The content portion 420 further includes a personalized difficulty assessment. Illustratively, the personalized difficulty assessment can be determined by comparing a user's individual skill metrics to corresponding difficulty metrics of the content item. In one embodiment, the expected difficulty may be determined based on comparing each skill and difficulty metric pair (e.g., those skill and difficulty metric combinations determined to have a predictive value with regard to the user's comprehension), and determining a relative difficulty level for each pair. As noted above, while skill and difficulty metric "pairs" are described herein for simplicity, in some instances groups of skill metrics may be paired with groups of difficulty metrics (e.g., one or more skill metrics, when evaluated against one or more difficulty metrics, may be determined to be predictive of a user's comprehension of a content item). Thereafter, the content catalog may weigh each relative difficulty level to determine a user's expected difficulty. In one embodiment, each relative difficulty may be weighted linearly. Weights of each relative difficulty level within a linear algorithm may be determined, for example, based on an analysis of previously generated expected difficulties (e.g., based on how successfully previous expected difficulties predicted a user's comprehension of a content item). In other embodiments, non-linear weighting may be utilized in establishing an expected difficulty. For example, relative difficulty levels that exceed a given threshold may be weighted more highly within the algorithm than relative difficulty levels below the threshold. Such non-linear weighting may reduce the likelihood that any single difficulty metric of a recommended content item greatly exceeds a corresponding skill metric of the user.

As shown in FIG. 4, the expected difficulty of "The Call of the Wild" to Chris Customer is "medium to low," indicating that the user is likely to readily comprehend the content item. Further, FIG. 4 includes a brief explanation of the recommendation. Specifically, content portion 420 indicates that the user is likely to find the audiobook engaging, but that the vocabulary difficulty metrics of the content item may exceed the current vocabulary skill level of the user. Illustratively, the brief explanation within content portion 420 may be automatically generated by the skill-based content delivery system 110 based at least in part on a human-readable identification of the difficulty metric of the content item that most exceeds a corresponding skill metrics of the user.

Control portion 422 enables the user, Chris Customer, to further interact with the skill-based content delivery system 110. Specifically, portion 422 includes a first input control 424 enabling Chris Customer to request additional skill-based recommendations from the skill-based content delivery system 110. Generation of skill-based recommendations is discussed in more detail below with reference to FIG. 5. Accordingly, selection of input control 424 can enable Chris Customer to transmit a request for a content based recommendation to the skill-based content delivery system 110. Input control 426 enables Chris Customer to search for and locate content items by an expected difficulty level personalized to Chris Customer. Specifically, selection of input control 426 can enable Chris Customer to specify a requested difficulty level (e.g., according to a defined scale established by the skill-based content delivery system 110), and transmit a request to the skill-based content delivery system 110 to generate a skill-based recommendation for content items of the specified difficulty level. Still further, input control 428 enables Chris Customer to interact with the skill-based content delivery system 110 to modify his associated skill metrics. Specifically, selection of input control 428 enables Chris Customer to complete a language assessment through the skill-based content delivery system 110 designed to assess skill metrics of Chris Customer. Language assessments are common within the art, and therefore will not be described in more detail herein. One skilled in the art will appreciate that additional input controls may be provided within the content portion 422, enabling users to further interact with the skill-based content delivery system 110 (e.g., by providing feedback for consumed items, entering users preferences, etc.).

Figure 5:
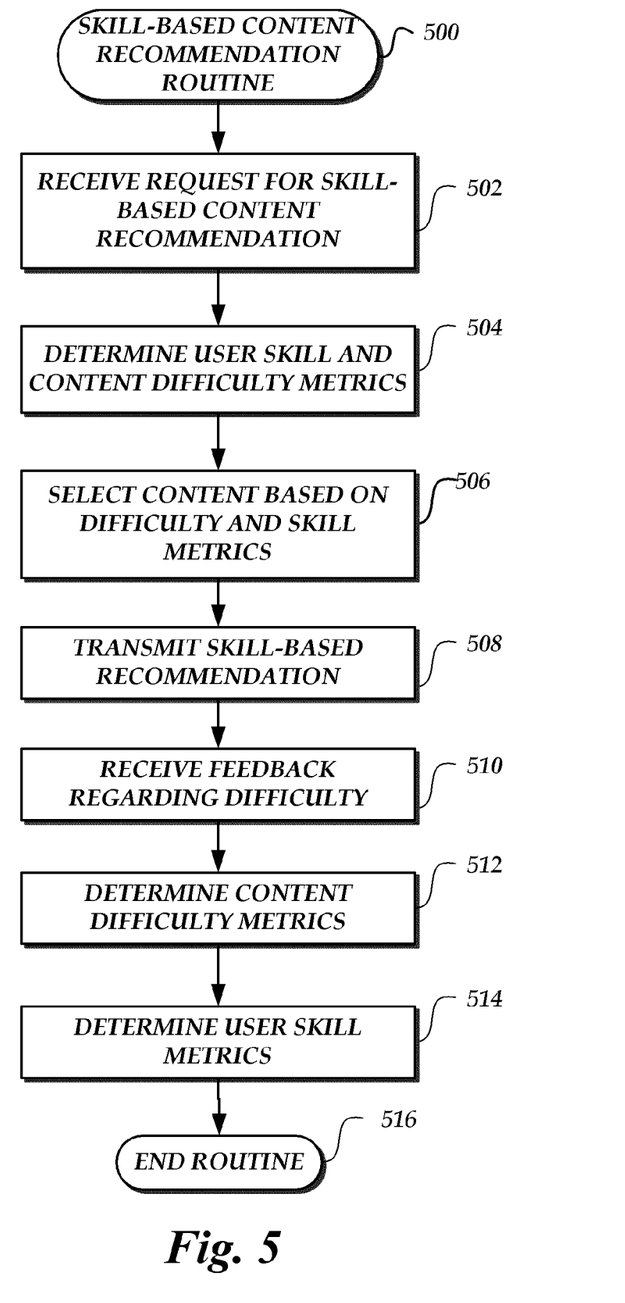
FIG. 5 is a flow diagram depicting an illustrative routine for providing skill-based content recommendations based on difficulty metrics of an item and a user's expected skill level, which may be implemented by the skill-based content delivery system of FIG. 1.

With reference to FIG. 5, an illustrative routine 500 for generating a skill-based content recommendation will be described. The routine 500 may be carried out, for example, by the content recommendation server 114 of FIG. 1. The routine 500 begins at block 502, where a request for a skill-based content recommendation is received at the content recommendation server 114. In one embodiment, the request may be received as a result of user interaction with the interface server 112 (e.g., by selecting input 424 of FIG. 4).

Thereafter, at block 504, the content recommendation server 114 determines user skill metrics of the user, as well as content difficulty metrics for content items that may be potentially recommended to the user. In one embodiment, skill metrics may be retrieved from a data store (e.g., the profile data store 116 of FIG. 1), and based on previous interactions of the user with the skill-based content recommendation system 100. In another embodiment, skill metrics may be determined based on user input to the skill-based content recommendation system 100. For example, where a user has not yet established skill metrics within the skill-based content recommendation system 100, the content recommendation server 114 may request that the user complete an assessment of their language skills, or provide a self-assessment of such skills.

Similarly, at block 504, difficulty metrics can be retrieved from a content data store, such as the content data store 118 of FIG. 1. As noted above, difficulty metrics can represent the potential difficulty of a user in comprehending a content item, based on multiple difficulty dimensions. Difficulty metrics can be determined, for example, based on automated analysis of the content items, based on user feedback received for the content items, based on difficulty metrics of other similar content items, or any combination thereof. In one embodiment, difficulty metrics for all possible content items are determined at the content recommendation server 114. In another embodiment, difficulty metrics are determined only for an initial set of potential recommendation candidates, such as content items selected based on a non-skill-based content recommendations system known within the art. In still more embodiments, difficulty metrics for a content item may be selected based at least in part on characteristics of the user. Illustratively, language learners residing or originating in a first country of origin may perceive a content item as more (or less) difficult than similar language learners residing in or originating in a second country. Similarly, users within a first age range may perceive a content item as more (or less) difficult than similar users within a second age range. Accordingly, in some embodiments, the skill-based content system 110 may maintain or generate difficulty metrics based on usage of a specific sub-set of users. For example, difficulty metrics may be generated for users of specific countries, age ranges, genders, interests, or other characteristics or demographics. In such embodiments, at block 504, the content recommendation server 114 may retrieve or determine difficult metrics generated based on feedback of users similar to a requesting user (e.g., having similar characteristics or demographics to the requesting user).

Thereafter, at block 506, the content recommendation server 114 utilizes the determined skill metrics and difficulty metrics to generate a recommendation for a content item to the user. Specifically, as described above, the content recommendation server 114 can maintain a mapping of one or more skill metrics to one or more corresponding difficulty metrics. In one embodiment, such a mapping may be partially or wholly pre-defined by an operator of the content recommendation server 114. In another embodiment, mappings may be determined by utilizing historical data regarding skill metrics and difficulty metrics of content items previously consumed by users, as well as the information regarding whether users successfully comprehended such content items. In one embodiment, this historical analysis may utilize machine learning techniques, as are known within the art, to determine correlations between one or more skill metrics and one or more difficulty metrics.

In some instances, the content recommendation server 114 can determine a set of relative difficulties of a content item for an individual user. Each relatively difficulty can be determined, for example, based on a distance between a skill metric of the user and a corresponding difficulty metric of a content item. Illustratively, if an audiobook has a relatively high difficulty metric with regards to words presented per minute, but a user's skill metric indicates that they generally consume content items at a much lower rate of words per minute, a high relative difficulty can be determined for this specific skill and difficulty metric pair. Each relative difficulty can thereafter be weighted in a linear or non-linear algorithm to determine an expected difficulty of the user in consuming the content. The content recommendation server 114 may then utilize the expected difficulty of each analyzed content item to select one or more content items to recommend to the user. For example, where a user desires to consume content within a specific difficulty range (e.g., selected in order to enhance fluency in the language of the content item), the content recommendation server 114 may select a content item within the specific difficulty range to recommend to the user. In some embodiments, the content recommendation server 114 may also utilize non-skill based metrics in recommending a content item. For example, where multiple content items fall within a desired expected difficulty range, the content recommendation server 114 may utilize subject matter, genre, author or other preferences of the user in selecting a set of recommended content items.

Thereafter, at block 508, the generated skill-based recommendation is transmitted to the user at a user computing device. Illustratively, the skill-based recommendation can be transmitted by use of an item display page, such as the display page 400 of FIG. 4.

The routine 500 then continues to block 510, where feedback regarding the user's comprehension of the content item is received. As discussed above, feedback may include implicit feedback, such as actions taken by the user during or after consumption of the content item, as well as explicit feedback, such as an assessment by the user assessing comprehension of the content item or reporting difficulty experienced by the user.

At block 512, feedback received from the user can be utilized to revise the difficulty metrics of the content item. For example, where the user has reported a greater than predicted difficulty in comprehending the content item, difficulty metrics of the content item can be increased. Conversely, where the user has reported a less than predicted difficulty in comprehending the content item, difficulty metrics of the content item may be decreased. In one embodiment, specific difficulty metrics of a content item may be modified based on the feedback of the user. For example, assume a vocabulary difficulty metric of the content item was previously established at a low level. Where a user with a greater than average vocabulary skill metric conducted a large number of dictionary look-up actions while consuming the content item, the vocabulary difficulty metric of the content item may be increased. In one embodiment, the amount of change within a difficulty metric of a content item may be proportional to the amount of feedback regarding the content item received from other users. For example, the feedback received by an individual user may be weighed against the total feedback received, to determine an overall difficulty metric of an item.

Further, at block 514, feedback received from the user can be utilized to revise the skill metrics of the user. For example, where the user has reported a less than predicted difficulty in comprehending the content item, skill metrics of the user may be increased. Conversely, where the user has reported a greater than predicted difficulty in comprehending the content item, skill metrics of the user can be decreased. In one embodiment, specific skill metrics of the user may be modified based on the feedback of the user. For example, assume a vocabulary difficulty metric of the content item was previously established at a high level. Where a user with a lower-than-average vocabulary skill metric conducted a small number of dictionary look-up actions while consuming the content item, the vocabulary skill metric of the user may be increased. In one embodiment, the amount of change within a skill metric of a user may be proportional to the total amount of feedback received from the user. For example, the feedback received with respect to consumption of an individual content item may be weighed against the total feedback received for the user to determine overall skill metrics of the user. The routine 500 may then end at block 516.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to generate recommendations of content items, the system comprising:
    a non-volatile data store including information regarding a plurality of content items, the information including, for a content item of the plurality of content items, a difficulty level representing a difficulty of users in consuming the content item; and
    a processor in communication with the non-volatile data store and configured with computer-executable instructions that, when executed by the processor, cause the processor to:
        receive a request from a computing device of a user for a recommendation;
        select the content item from the plurality of content items based at least in part on a comparison of the difficulty level of the content item and a skill level of the user, wherein the skill level of the user is determined based at least in part on a previous consumption of another content item by the user;
        transmit a recommendation for the content item to the computing device of the user;
        receive, from the computing device of the user, interaction information determined from monitoring interaction of the user with the computing device, wherein the interaction includes a number of page turns of the content item, and wherein the interaction information includes an indication of a speed at which the user consumes the content item based at least in part on the number of page turns;
        determine, based at least in part on the interaction information, a user-specific difficulty of the content item for the user;
        modify the difficulty level of the content item based at least in part on the interaction information and the skill level of the user to form a modified difficulty level of the content item;
        store the modified difficulty level of the content item in the non-volatile data store; and
        select the content item as a recommended content item for a second user based at least in part on the modified difficulty level of the content item.

2. The system of claim 1, wherein the content item comprises at least one of an audiobook, an electronic book, or a video.

3. The system of claim 1, wherein the computer-executable instructions further cause the processor to modify the skill level of the user based at least in part on the interaction information.

4. The system of claim 1, wherein the interaction information further includes at least one of a total duration spent consuming the content item, an average session length of a user in consuming the content item, a frequency at which portions of the content item are repeated by the user, a set of words within the content item for which definitions are viewed by the user, a frequency at which definitions for words within the content item are viewed by the user, whether one or more portions of the content item are highlighted or selected by the user, whether the user completes the content item, or whether the user recommends the content item to other users.

5. The system of claim 1, wherein the difficulty level of the content item is determined based at least in part on a plurality of difficulty metrics.

6. The system of claim 5, wherein the difficulty level of the content item is determined based at least in part on a weighting of the plurality of difficulty metrics.

7. The system of claim 5, wherein the plurality of difficulty metrics include at least one of a format of the content item, vocabulary of the content item, an average number of words per sentence within the content item, an average number of syllables per word within the content item, or an average difficulty rating of the content item by other users.

8. A method for providing content recommendations, the method comprising:
    receiving a request from a computing device of a user for a recommendation;
    determining, for a first content item, a difficulty level representing a difficulty of users in consuming the first content item;
    determining, for a second content item, a difficulty level representing a difficulty of users in consuming the second content item;
    selecting a content item from the first content item and the second content item based at least in part on a comparison of the difficulty level of the content item and a skill level of the user;
    transmitting a recommendation of the content item to the computing device of the user;
    receiving, from the computing device of the user, interaction information that includes an indication of a speed at which the user consumes the content item based at least in part on a number of page turns of the content item;
    determining, based at least in part on the interaction information, a user-specific difficulty of the content item for the user;
    modifying the difficulty level of the content item based at least in part on the interaction information and the skill level of the user to form a modified difficulty level of the content item; and
    selecting the content item as a recommended content item for a second user based at least in part on the modified difficulty level of the content item.

9. The method of claim 8 further comprising determining the skill level of the user based at least in part on a plurality of skill metrics.

10. The method of claim 9, wherein the plurality of skill metrics include at least one of an average speed at which the user consumes content items, an average length of time a user takes in consuming content items, a frequency at which portions of content items are repeated by the user, an average difficulty of vocabulary within content items consumed by the user, a frequency at which definitions for words are viewed by the user, or an average rate of completion of content items by the user.

11. The method of claim 10 further comprising modifying at least one of the plurality of skill metrics based on the interaction information.

12. The method of claim 8, wherein the difficulty level of the content item is based at least in part on feedback regarding the content item received from a plurality of users.

13. The method of claim 8, wherein the difficulty level of the content item is based at least in part on analyzing the content of the content item.

14. The method of claim 8, wherein the difficulty level of the content item is based at least in part on a difficulty level of other content items similar to the content item.

15. The method of claim 8, wherein the content item is selected based at least in part on preferences of the user.

16. The method of claim 8, wherein the interaction information further indicates at least one of: a length of time that the content item is consumed, or a request to view a definition of a word appearing in the content item.

17. The method of claim 8 further comprising, prior to selecting the content item as the recommended content item for the second user, performing a comparison of the modified difficulty level of the content item and a skill level of the second user, wherein the content item is selected as the recommended content item based at least in part on the comparison.

18. A computer-readable non-transitory storage medium including computer-executable instructions that, when executed by a processor, cause the processor to:

receive a request from a computing device of a user for a recommendation;

determine, for a first content item, a difficulty level representing a difficulty of users in consuming the first content item;

determine, for a second content item, a difficulty level representing a difficulty of users in consuming the second content item;

select a content item from the first content item and the second content item based at least in part on a comparison of the difficulty level of the content item and a skill level of the user in consuming the content item;

transmit a recommendation of the content item to the computing device of the user;

receive, from the computing device of the user, interaction information that includes an indication of a speed at which the user consumes the content item based at least in part on a number of page turns of the content item;

determine, based at least in part on the interaction information, a user-specific difficulty of the content item for the user;

modify the difficulty level of the content item based at least in part on the interaction information to form a modified difficulty level of the content item; and select the content item as a recommended content item for a second user based at least in part on the modified difficulty level of the content item.

19. The computer-readable, non-transitory storage medium of claim 18, wherein the difficulty level of the content item is determined based at least in part on a plurality of difficulty metrics.

20. The computer-readable, non-transitory storage medium of claim 19, wherein the difficulty level of the content item is determined based at least in part on at least one of a linear or non-linear weighting of the plurality of difficulty metrics.

21. The computer-readable, non-transitory storage medium of claim 18, wherein the difficulty level of the content item is based at least in part on feedback regarding the content item received from a plurality of users.

* * * * *